United States Patent [19]

Ottoson

[11] 4,347,466
[45] Aug. 31, 1982

[54] MOTOR CONTROLLING

[75] Inventor: Allen E. Ottoson, Westboro, Mass.

[73] Assignee: Vee Arc Corporation, Westboro, Mass.

[21] Appl. No.: 107,595

[22] Filed: Dec. 27, 1979

Related U.S. Application Data

[63] Continuation of Ser. No. 904,402, May 10, 1978.

[51] Int. Cl.³ .......................................... H02K 27/20
[52] U.S. Cl. ..................................... 318/301; 318/379;
318/510; 318/419
[58] Field of Search .............. 318/269, 376, 379, 380,
318/509, 512, 301, 510, 511, 419, 815, 438.1,
339, 342, 343; 323/89 AG, 345 A, 345 C

[56] References Cited

U.S. PATENT DOCUMENTS

| | | | |
|---|---|---|---|
| 2,400,559 | 5/1946 | Majlinger et al. | 323/89 AG |
| 2,558,086 | 6/1951 | Herchenroeder | 323/89 AB |
| 2,634,392 | 4/1953 | Pohm | 323/89 AG |
| 3,096,470 | 7/1963 | Kalenian | 318/510 X |
| 3,302,090 | 1/1967 | Rayfield | 318/380 X |
| 3,564,365 | 2/1971 | Zelina | 318/376 X |
| 3,641,409 | 2/1972 | Maeda et al. | 318/293 X |
| 3,786,329 | 1/1974 | Whited | 318/379 |
| 3,792,330 | 2/1974 | Ottoson | 318/269 |
| 3,916,276 | 10/1975 | Ottoson | 318/269 |
| 4,027,220 | 5/1977 | Wilkerson | 318/376 |

Primary Examiner—Ulysses Weldon
Attorney, Agent, or Firm—Wolf, Greenfield & Sacks

[57] ABSTRACT

D.C. motor control utilizing an input transformer with magnetic leakage and current control to allow power, whether generated occasionally or continuously from the motor (induced by load inertia and the like) to be smoothly returned back into the main A.C. power line, consistent with continuous smooth speed control (low form factor), low heating and low cost.

16 Claims, 6 Drawing Figures

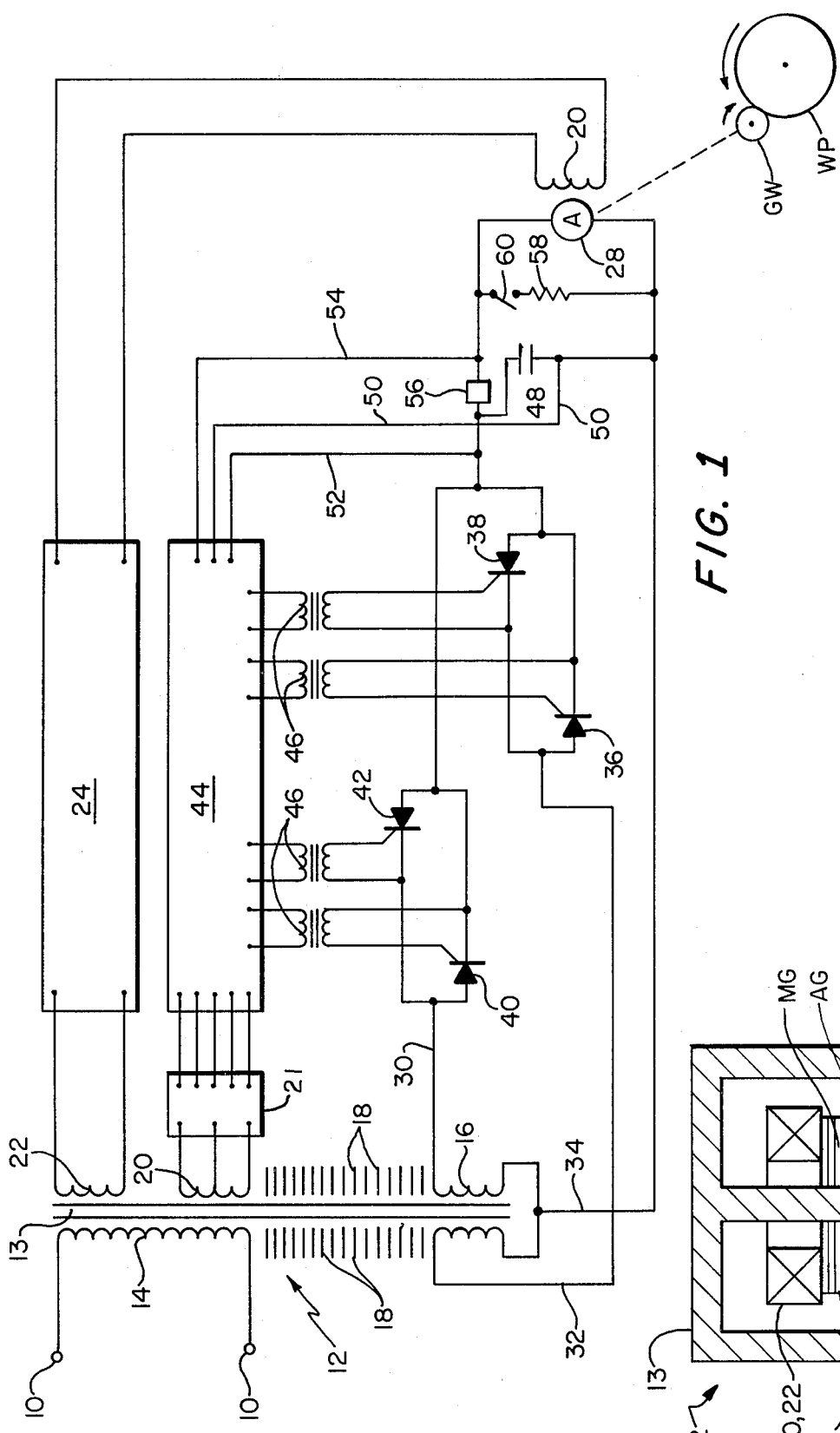
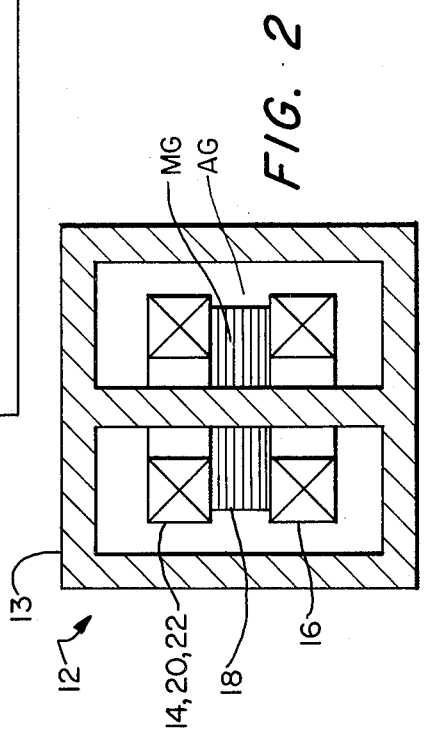
FIG. 1
FIG. 2

MOTOR CONTROLLING

RELATED APPLICATION

This is a continuation of application Ser. No. 904,402 filed May 10, 1978.

BACKGROUND OF THE INVENTION

The present invention relates to a D.C. motor drive system with two quadrant motoring regenerating operation.

It is known in the art of machine drives that some loads tend to develop their own positive torque which creates a speed-up influence which is disadvantageous from the standpoint of maintaining as constant a speed as possible. A similar problem may occur when a lower motor speed is set by a controller relative to the then speed of the motor. It is well known in the existing technology to provide mechanical or electrical means to deal with this problem such as through heat dissipation using a dynamic braking resistor, through the use of an auxiliary generator system or other means. With existing solutions there are heating problems and many times the requirement of an excessively large or costly motor. In accordance with the present invention more torque and horsepower are developed for a given motor size. The form factor is quite close to unity which thus prolongs brush life. Furthermore, with the control of this invention 120 Hertz discontinuities are removed.

Accordingly, an object of the present invention is to provide motor speed control that is of improved type not having the drawbacks presented by the prior art techniques.

SUMMARY OF THE INVENTION

In accordance with the invention, a regenerative mode of a D.C. drive motor established by either load overdrive or change of controlled speed setting is accommodated by smoothly putting power back in the input power line using an inductive addition to the power line which participates both in the application of input power to the motor armature for motoring and in the reverse application of power from armature to input in the generating mode. In accordance with the invention the improved low form factor exists under both motoring and generating modes. An inductive reactance (or more than one) is placed in an A.C. portion of means for applying electrical power from an A.C. input to a D.C. armature. This means for applying power includes a rectifier using oppositely poled sets of SCR's in place of the usual single SCR provided for each half cycle of alternating current. One SCR of each pair is triggered in the motoring mode while the other SCR of each pair is triggered in the generating mode with the triggering of the SCR's being in phase coordination. Only one pair of SCR's is used for half wave rectification, but it is preferred that full wave rectification be provided especially with the use of the input inductive reactance in the A.C. portion of the system. The pairs of SCR's can be used in connection with a center tap rectifier secondary arrangement of an input transformer. Alternatively, a non-center tapped transformer with two instead of three output lines can be utilized if a bridge (four leg) rectifier (made up of SCR's in each leg of each such bridge) is employed in each of the two lines.

In lieu or in addition to utilizing one or more choke coils, a choke coil type transformer can be utilized with magnetic shunting (leakage) between secondary and primary windings. As used herein, "choke" or "magnetic leakage" refers to inductors (single or magnetically coupled) comprising part of the electrical power transmission circuit—as opposed to auxiliary, low power level control circuits—and comprising metal and air components of a magnetic leakage path—as opposed to the conventional small air core inductors used in D.C. motor power circuits to smooth out the effects or misfires or occasional undesired transients and which would be of negligible assistance in relation to the objects of the present invention; even if used with the forward and reverse direction SCR's as described above.

The inductive reactance creates a negative slope D.C. voltage $(y)$ — current $(x)$ graph of armature operation (as opposed to constant voltage) to an extent that maximum motor (armature) current is limited to ten times full load current or less, preferably substantially less ($2\times$ to $5\times$).

The SCR's are isolated from each other via gate pulse transformers, or gate optical power relays, or the like, and gate firing lockout is utilized to maintain integrity of the firing schedule. However, the combination set forth herein assures that if SCR's misfire, the otherwise disastrous effects thereof are attenuated by the line inductance and magnetic leakage.

These and other objects features and advantages of the invention will be apparent from the following detailed description of preferred embodiments, in which:

BRIEF DESCRIPTION OF THE DRAWINGS

FIG. 1 is a block diagram of the circuit of a D.C. motor drive system in accordance with a first preferred embodiment of the invention;

FIG. 2 is a schematic cross-section representation of a transformer component utilized in the FIG. 1 system;

DETAILED DESCRIPTION OF PREFERRED EMBODIMENTS

Figure 3:
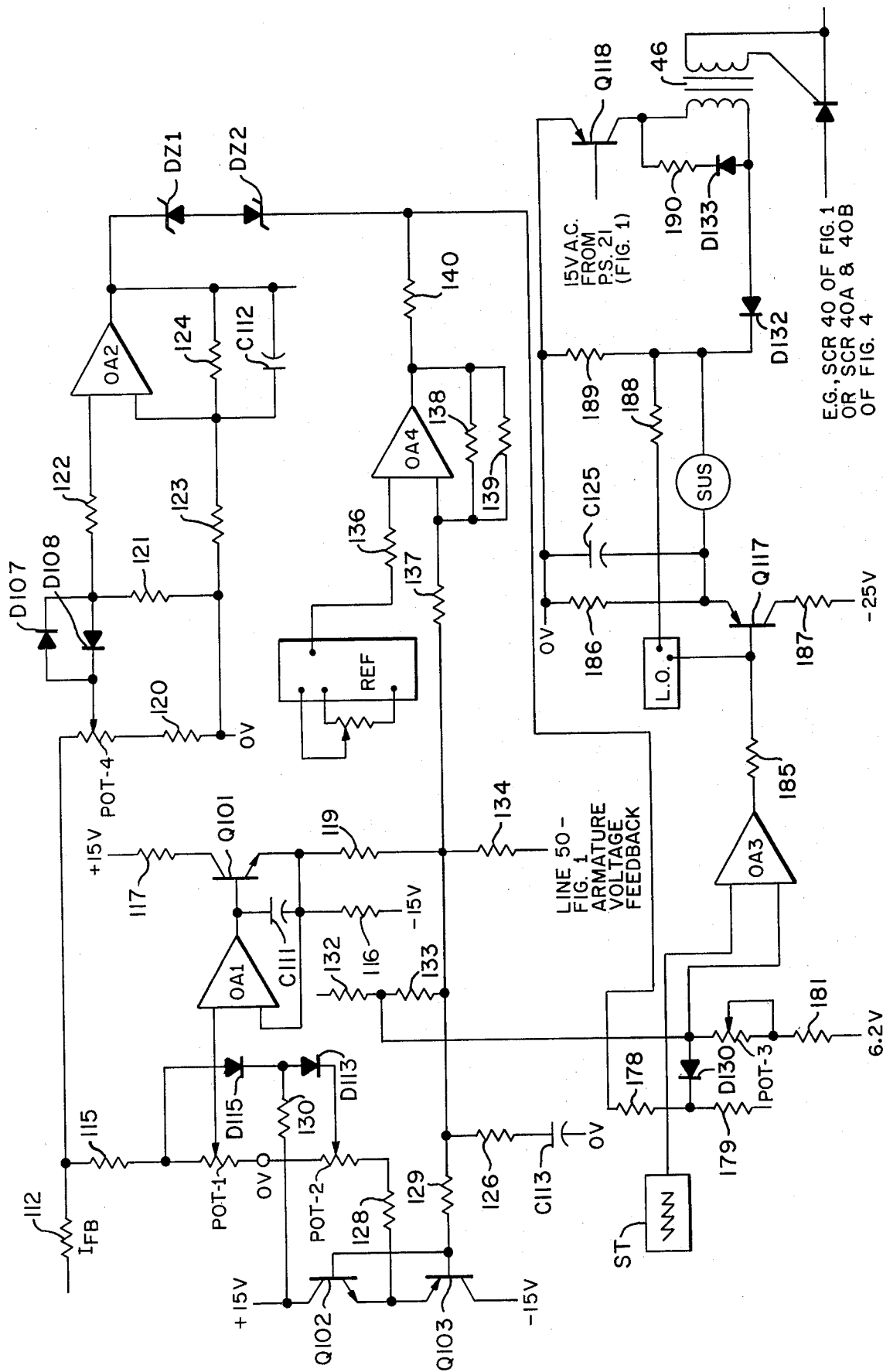
FIG. 3 is a detailed circuit diagram of the portion of the FIG. 1 system.

Referring now to FIGS. 1 and 2, there is shown a pair of line voltage (A.C.) terminals 10 and a transformer 12 with a core 13 and primary windings 14 connected to the terminals. The transformer has a principal secondary winding 16 and ferromagnetic metal shunt elements 18 which may be discs, washers or the like and which provide a radial magnetic leakage path which is partially metal (MG) and partially air (AG). Additional secondary windings 20 and 22 are provided on the transformer preferably overwound with the primary and which are arranged without the magnetic shunts. The secondary winding 22 is connected to a rectifier 24 which supplies D.C. voltage to the field winding 26 of a motor, which has an armature 28. Secondary winding 20 supplies a power supply 21 to provide various controlled A.C. and D.C. plus and minus voltages.

The above-mentioned secondary winding 16 is center-tapped and has leads 30, 32, 34 connected to armature 28 via two sets of oppositely poled SCR's—36 and 38 in the first set and 40 and 42 in the second set, all triggered by a controller 44 via pulse transformers 46.

A capacitor 48 is provided in circuit with armature 28 in the D.C. portion and together with the high inductive reactance of the secondary 16 (in the A.C. portion of the circuit) as affected by the magnetic leakage shunts, provides form factor filtering for smooth forward motoring power and reverse generating power. Armature feedback voltage is established via lead 50 connected to controller 44. Leads 52 and 54 are connected across a thermal overload relay 56 which provides thermal protection to the armature line. The thermal overload relay 56 also provides a small fixed resistance to develop a voltage drop corresponding to armature current. This voltage drop current indicating signal is provided to controller 44 via lines 52,54.

Within controller 44, as depicted in FIG. 3, a voltage comparator OA4 has as inputs, a manual speed setting as determined by the reference input via resistor 136 to one input of the comparator (via a potentiometer or the like between factory set maximum and minimum limits), and as a second input, the armature feedback voltage with the resultant signal for adjusting the triggering of the SCR's 36, 38, 40 and 42. Such triggering control is per se known and is described, for instance in my prior U.S. Pat. Nos. 3,916,276, granted Oct. 28, 1975 and 3,792,330, granted Feb. 12, 1974, both of which are incorporated herein by reference.

A relay switch 60 and dynamic braking resistor 58, both conventional, are provided for stopping the motor for emergency slow down.

The center tap transformer secondary 16, lines 30, 32 and 34 and the armature act as a full wave rectifier with filtering provided by capacitor 48. When line 32 is positive in a half cycle of A.C. power supply to the secondary during normal operation, SCR 36 is fired by controller 44 via the appropriate isolating pulse transformer 46 for direct current conduction through the armature 28 and return to the transformer secondary via center-tap line 34. In the next half cycle, line 30 is positive and the controller is timed to fire SCR 40 via the appropriate transformer 46 to provide D.C. conduction through armature 28 and return to the transformer secondary 16 via center-tap line 34.

FIG. 1 discloses a load driven by the armature shaft such as the grinding wheel GW. This grinding wheel is shown operating on a work piece WP such as a drum that is to be ground. In grinding operations of this type it is important to have a low form factor for the purpose of providing precise speed control to provide a uniform work piece surface.

The control lines 50 and 54 previously described in FIG. 1 couple respectively to resistors 134 and 112 shown in FIG. 3. As indicated previously the signal from line 50 couples by way of resistor 134 and resistor 137 to a second input of the voltage comparator OA4. When the motor armature is overdriven by positive torque so as to act as a generator, the increase speed condition is signalled to controller 44 via line 50 to comparator OA4 which controls firing pulses to SCR's 38 and 42 instead of SCR's 36 and 40 in their appropriate respective half cycles until the signal received via line 50 indicates a lower signal level and a return from generator to motor operation. The shunting elements 18 filter the returned generated power to the power mains.

Throughout both motoring and generating modes of operation, a smooth speed control of low form factor and low internal heating is applied via control of portions of respective duty (half) cycles in which the SCR's fire. IR compensation of tapered form is applied. That is, less IR compensation is applied at high speeds and more at low speeds.

Controller 44 is described in more detail now in connection with FIG. 3 wherein it is shown how one SCR (40) exemplary of all the others is fired in coordination with input line voltage which is isolated, reduced, rectified and filtered via power supply 21 [operated off transformer secondary coil 20 (FIGS. 1-2)]. The lockout circuit L.O. operates so that, should SCR 40 be in a conductive state, a corresponding circuit controlling SCR 42 will control that SCR in a non-conductive state. When the line voltage changes to indicate a generating mode of operation, then the SCR 42 is permitted to conduct cyclically while the SCR 40 is held off. In FIG. 3 the reduced AC line voltage (15 volts) is applied via a resistor to the base of transistor Q118, and this enables firing when allowed by a conduction through a silicon unilateral switch SUS. Transistor Q117 controls the switch SUS and is enabled from the operational amplifier OA3 which has as inputs a sawtooth waveform generated by ST (which can be overridden by a signal from a lockout circuit L.O.) and an input from line E which is connected to current and voltage controlling circuits built around comparator-operational amplifiers OA2 and OA4, respectively. A reference current signal REF is manually set for speed control.

The IR compensation is tapered by the circuit comprising diodes D113 and D115, transistors Q102 and Q103 resistors 128 and 130 and potentiometer 2. This circuit has the same reference input as the voltage comparator OA4 via line 50 and resistors 134 and 129. The tapering provides lower IR compensation at high speeds than at lower speeds.

Appropriate circuit valves for the components shown in FIG. 3 replication of the firing arrangement shown for three more SCR's and lockout circuitry are, per se, all conventional elements of electrical design, readily implemented for any particular controlled motor size by one of ordinary skill in the art. However, in one example, these values were used for a 0.5–7.5 H.P. motor control (with the indicated voltages of FIG. 3).

| Resistors (ohms) | Diodes |
| --- | --- |
| 112-1K | DZ1&1 - 10V.Zener |
| 115-2.2K | D113&115 - 1a, 200 P.I.V. |
| 116-4.7K | D130,132&133 - 1a, 200 P.I.V. |
| 117-1K | D107&108 - 1a, 200 P.I.V. |
| 119-470 | |
| 120-430 | Capacitors (Microfarads) [volts] |
| 121-2.2K | C111&113 - (.01) [10] |
| 122-1.8K | C112 - (2) [100] |
| 123-212K | C125 - (0.33) [100] |
| 124-120K | |
| 126-10K | POTs (ohm) |
| 130-10K | POT-1  10K |
| 129-1.2K | POT-2  200 |
| 132-4.7K | POT-3  50K |
| 133-10K | POT-4  5K |
| 134-12K | |
| 136-5.6K | |
| 137-5.6K | |
| 138-1.2Meg | |
| 139-1K | |
| 140-1K | |
| 178-4.7K | |
| 179-7.5K | |
| 180-68K | |
| 181-82K | |
| 184-33K | |
| 186-1K | |
| 188-10K | |

-continued

| 189-1K |

Capacitor 48 varies with size. For a 2 H.P. motor, it was 3900 microfarads, 250 volts.

It will also be understood by those skilled in the art that the single phase A.C. shown in all embodiments hereof can be adapted to a multi-phase operation. The FIG. 6 embodiment is preferred for 3-phase adaptation.

Figure 4:
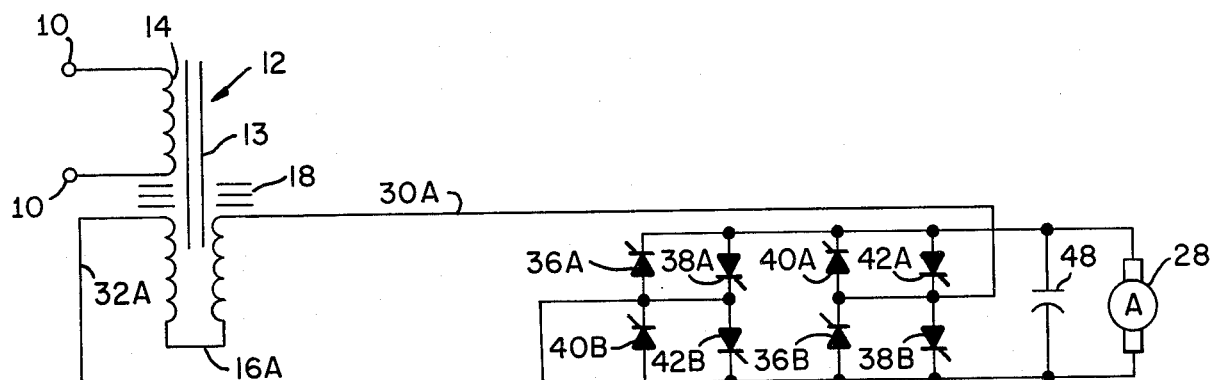
FIGS. 4-6 are partial schematics of additional embodiments of D.C. motor drive systems within the scope of the invention.
Figure 5:
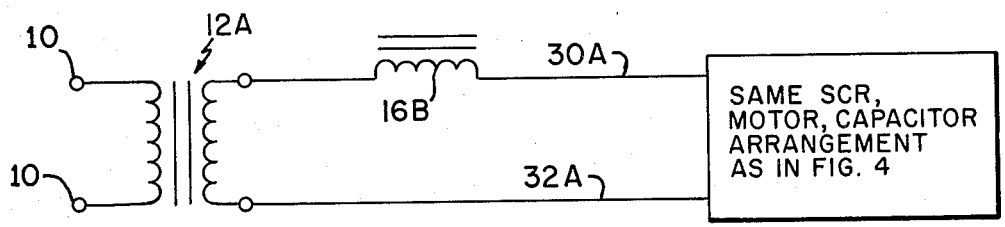
Figure 5A:
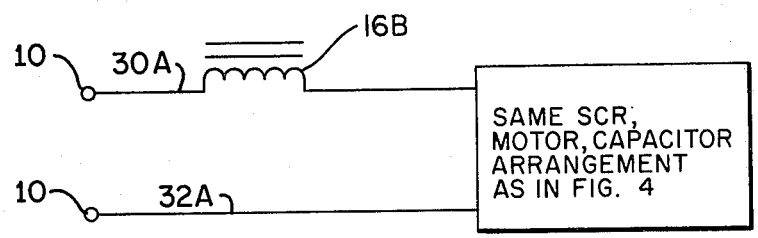
Figure 6:
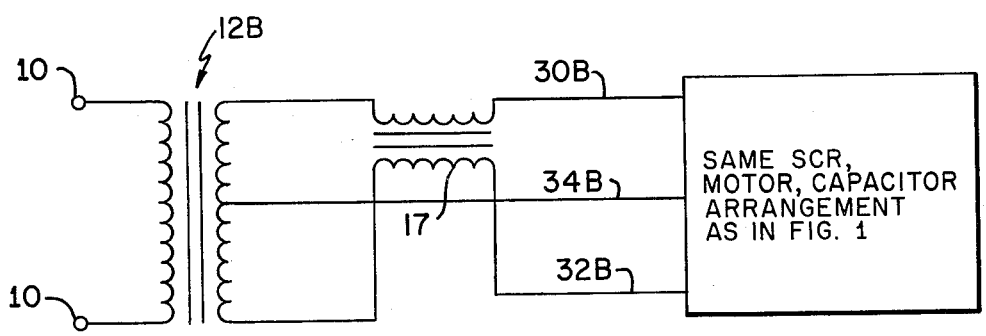

Referring now to FIGS. 4–6, other embodiments of the invention are shown. In FIG. 4 a transformer 16A (not center-tapped) with magnetic shunts 18 as in FIG. 1 provides power to armature 28 via two bridges in its output leads 30A and 32A. Each bridge comprises four SCR's poled as shown with 40A and 40B gated to fire simultaneously on one half (and 42A–42B on the other half) or a motoring cycle and with 38A/38B and 36A/36B firing on the two halves of generating cycles. In FIG. 5 an isolation transformer 12A is used (and in FIG. 5A there is no transformer at all) and a choke coil 16B is used in one of lines 30A, 32A. The choke coil has a part metal, part air magnetic leakage (shunt) path. In FIG. 6 a dual wound choke 17 is used with a center tap isolation transformer 12B. In all of these variant embodiments, SCR firing sequence and limiting controls as described above in connection with FIG. 1 may be employed.

The inductive reactance element used can have considerable variety of forms. But in general it should limit armature current to a maximum no greater than 10× full load, preferably 2× to 5× full load. Conventional SCR heat dissipation means should be employed therewith and the choke or shunted transformer should be physically isolated from metal chassis or other metal objects of the system.

The input inductive reactance, in addition to permitting return of power to the mains during generating, also functions as a means for current limiting. Furthermore, the inductive reactance provides form factor filtering and line noise filtering. This operation is also present in either generating or motoring modes.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by the apparatus and techniques herein disclosed and limited solely by the scope and spirit of the appended claims.

What is claimed is:

1. A DC motor system operable in motor and generator modes and comprising:
    an AC source for delivering AC power,
    a DC motor having a motor field and an armature,
    rectifier means including at least one pair of oppositely poled controlled rectifiers and an armature capacitor coupled from said controlled rectifiers and disposed across said armature,
    said rectifier means connected to receive AC power from said AC source and to rectify said AC to DC across said armature capacitor,
    controller means including means coupled from the AC source and means responsive to armature voltage magnitude for controlling the triggering of one of said controlled rectifiers to enable current flow for normal motor operation of the armature and for alternatively and mutually exclusively controlling the triggering of the other of said controlled rectifiers to enable the generator mode,
    inductive reactanct means including a field conductor,
    and electrical conductor means interconnecting in series said AC source, field conductor and rectifier means,
    said field conductor providing a magnetic circuit leakage path coupled in series between the AC source and the rectifier means to apply power generated in the armature back into the AC source via the magnetic leakage path as well as applying power input to the armature in motoring.

2. A motor system as set forth in claim 1 wherein said armature capacitor and inductive reactance means form a current smoothing filter.

3. A motor system as set forth in claim 1 wherein said inductive reactance means creates a negative slope DC voltage-current waveform of armature operation whereby maximum motor current is limited to ten times full load current.

4. A motor system as set forth in claim 1 wherein said rectifier means includes a full wave rectifier comprising two pairs of oppositely poled controlled rectifiers.

5. A motor system as set forth in claim 1 wherein said means providing a magnetic circuit path includes a center-taped transformer.

6. A motor system as set forth in claim 5 wherein said rectifier means includes a full wave rectifier comprising two pairs of oppositely poled controlled rectifiers.

7. A motor system as set forth in claim 1 wherein said inductive reactance means is sized and arranged to limit maximum armature current to 10 times full load current.

8. A motor system as set forth in claim 7 wherein the maximum armature current is limited to 5 times full load current.

9. A motor system as set forth in claim 1 wherein said magnetic circuit leakage path includes metal shunt means.

10. A motor system as set forth in claim 1 wherein said inductive reactance means includes a part metal, part air-gap magnetic field conductor.

11. A motor system as set forth in claim 1 including feedback means responsive to armature voltage for controlling operation of said controller means, the armature signal at one state causing said one controlled rectifier operation and in another state causing said other controlled rectifier operation.

12. A motor system as set forth in claim 1 wherein said inductive reactance means includes a magnetic field conductor having means for providing a radial magnetic leakage path creating a negative slope DC voltage-current waveform of armature operation whereby maximum motor current is limited to ten times full load current, said rectifier means comprising a full wave rectifier including two pairs of oppositely poled controlled rectifiers, said means coupling the AC source to the rectifier means including transformer means having a primary for receiving the AC source power and at least one secondary winding separated physically from the primary winding by said inductive reactance means, said controller means including feedback means responsive to an armature signal for controlling operation of said controlled rectifiers, the armature signal at one state causing said one controlled rectifier of each pair to operate for motoring mode and in another state causing said other controlled rectifier of each pair to operate for generating mode.

13. A motor system as set forth in claim 12 wherein said transformer means has a first secondary winding for providing power to the motor field, a second secondary winding and associated supply for operating said controller means, and a third secondary winding forming a part of the full wave bridge and being center-tapped having a common lead coupled to the armature and first and second end leads coupling respectively to the first and second pairs of oppositely poled controlled rectifiers.

14. A motor system as set forth in claim 13 wherein said shunt elements are disposed between the primary winding and the third secondary winding with the other secondary windings directly inductively coupled to the primary winding.

15. A motor system as set forth in claim 1 wherein the oppositely poled rectifiers are directly connected anode of one to cathode of the other and cathode of one to anode of the other.

16. A motor system as set forth in claim 14 wherein each pair of rectifiers they are directly connected anode of one to cathode of the other and cathode of one to anode of the other.

* * * * *